United States Patent [19]

Uedaira et al.

[11] Patent Number: 4,889,706

[45] Date of Patent: Dec. 26, 1989

[54] METHOD OF MANUFACTURING FINE POWDER OF LEAD STANNATE

[75] Inventors: Satoru Uedaira; Masayuki Suzuki, both of Yokohama; Hiroshi Yamanoi, Hiratsuka; Hidemasa Tamura, Yokohama, all of Japan

[73] Assignee: Sony Corporation, Tokyo, Japan

[21] Appl. No.: 706,922

[22] PCT Filed: Jun. 5, 1984

[86] PCT No.: PCT/JP84/00286

§ 371 Date: Feb. 5, 1985

§ 102(e) Date: Feb. 5, 1985

[87] PCT Pub. No.: WO84/04911

PCT Pub. Date: Dec. 20, 1984

[30] Foreign Application Priority Data

Jun. 6, 1983 [JP] Japan .................. 58-100593

[51] Int. Cl.$^4$ .................. C01G 19/00; C01G 21/00
[52] U.S. Cl. .................. 423/593
[58] Field of Search .................. 423/593

[56] References Cited

U.S. PATENT DOCUMENTS 3,141,902 7/1964 Huntley et al. .................. 423/593

FOREIGN PATENT DOCUMENTS 8449 3/1972 Japan .................. 423/593

OTHER PUBLICATIONS

Sienko et al., *Chemistry*, Second Edition (1961), McGraw-Hill Book Company, pp. 485, 486.

*Primary Examiner*—John Doll
*Assistant Examiner*—Wayne A. Lange
*Attorney, Agent, or Firm*—Hill, Van Santen, Steadman & Simpson

[57] ABSTRACT

The present invention relates to a manufacturing method in which a hydrolyzed product of tin compound or a soluble stannate is reacted with tin chloride in neutral or alkaline aqueous solution so as to produce fine powder of lead stannate. In accordance with this method, it is possible to obtain fine powder of lead stannate which is high in purity and uniform in particle size.

8 Claims, 6 Drawing Sheets pH 13.5
5 Hours pH 13.5
5 Hours

100°C
5 Hours

100°C
5 Hours pH 10.7
100°C
4 Hours pH 10.7
100°C
4 Hours

METHOD OF MANUFACTURING FINE POWDER OF LEAD STANNATE

DESCRIPTION

1. Technical Field

The present invention relates to a method of manufacturing fine powder of lead stannate, $PbSnO_3$, which is one of dielectrics.

2. Background Art

Recently, a manufacturing method for making dielectrics of fine powder has been studied from various aspects and as an example of the use of such finely-powdered dielectrics, there is known that such dielectrics are applied to make a ceramic capacitor. As an electronic product is required to be made small in size and high in mounting density, a capacitor is required to be made small in size, light in weight, large in capacity and high in mounting density similarly to other electronic parts. For this reason, in the ceramic capacitor, the dielectrics must be formed into fine powder in order to make the ceramic layer thin and uniform in thickness. In the prior art, for the purpose of improving sintering property, temperature characteristic and the like, upon heat treatment, lead oxide PbO, for example, is added thereto. However, upon the heat treatment, there occurs a problem that since a part of lead oxide is evaporated, it becomes impossible to produce a ceramic capacitor having a uniform characteristic. Accordingly, in order to lower the sintering temperature to prevent the lead oxide from being evaporated and to obtain the ceramic capacitor having the uniform characteristic, it is desired that the dielectrics are made of fine powder.

Alternatively, as a raw material for an electrostriction material, a piezo-electric material, a transparent ceramic material and the like, in view of improving the sintering property and the temperature characteristic thereof, such a material is appreciated that it is small in diameter of its fine powder and the particle size thereof is uniform.

As one of such dielectrics, there is known lead stannate $PbSnO_3$. While such a method was tried to react lead oxide PbO with tin dioxide $SnO_2$ in solid-phase under normal pressure and at high temperature so as to obtain $PbSnO_3$, $PbSnO_3$ thus made is thermally decomposed into $Pb_2SnO_4$ and $SnO_2$ under normal pressure and at high temperature so that this manufacturing method is inappropriate. On the other hand, it is discovered that $PbSnO_3$ made by the high pressure synthesizing experiment is transferred from pyrochroi phase to perovskite phase and it is surmised that under normal temperature and normal pressure, the pyrochroi phase would be a stable phase. In the prior art manufacturing method of forming $PbSnO_3$ which is obtained in the solid-phase reaction into fine powder, such substance is ground by using a ball mill and so on and then sieved. However, disadvantages of this prior art method are such ones that a long duration of time is required for finely grinding the substance in the ball mill, an impurity such as metal oxide and so on is mixed therewith, the particle size distribution is poor and also the existence of powder having large size cannot be avoided. Accordingly, until the present, fine powder of lead stannate of excellent quality is not yet obtained as a host or an additive to the materials for electronic parts.

In view of the above aspect, the present invention is to provide a method of manufacturing fine powder of lead stannate which is high in purity and uniform in particle size.

DISCLOSURE OF INVENTION

In a method of manufacturing fine powder of lead stannate according to this invention, hydrolyzed product of tin compound or soluble stannate is reacted with lead salt in aqueous solution which has neutral property or alkaline property to thereby produce fine powder of lead stannate. According to this manufacturing method, it is possible to manufacture fine powder of lead stannate which is high in purity and uniform in particle size.

BEST MODE FOR CARRYING OUT THE INVENTION

Figure 1:
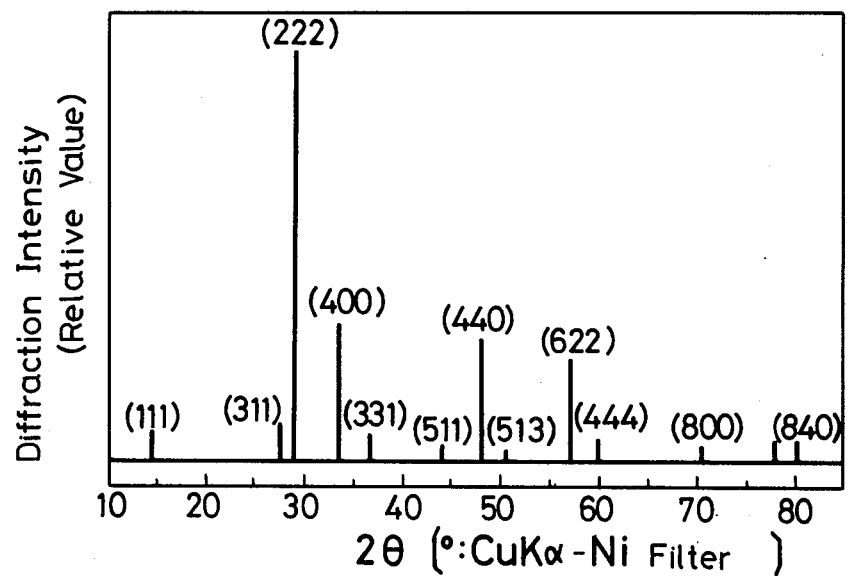
FIG. 1 is a diagram showing an X-ray diffraction pattern of fine powder of $PbSnO_3$ which is made by the present invention.

The present invention relates to a method in which hydrolyzed product of tin compound or soluble stannate is reacted with lead salt in aqueous solution which has neutral property or alkaline property and at temperature near its boiling point, the precipitate of fine powder of lead stannate thus made is rinsed by water or hot water to remove therefrom alkaline ion such as $K^+$, $Na^+$, $Li^+$ and the like and the product is filtered and then dried, thus fine powder of lead stannate, $PbSnO_3$ being produced.

In this case, as the tin compound, there can be used, for example, tin chloride $SnCl_4$, tin nitrate $Sn(NO_3)_4$, tin sulfate $SnSO_4$ or $Sn(SO_4)_2.2H_2O$.

When the hydrolyzed product of tin chloride and tin nitrate is obtained, it is sufficient that the tin compound is dissolved into water and then hydrolyzed by $NH_4OH$, LiOH, NaOH, KOH and so on. In the case of tin chloride, even if $PbCl_2$ is made in the course of the reaction, this compound is soluble to hot water so that no problem occurs by the treatment that thereafter the decantation is sufficiently carried out by the use of hot water for the compound. Further, when tin sulfate is employed as the tin compound, after such compound is dissolved into water and hydrolyzed by using the above alkali, in order to remove sulfate group $SO_4^{2-}$, it is necessary to carry out the treatment such as decantation, filtering, rinsing by water and the like.

As the soluble stannate, there can be used sodium stannate $Na_2SnO_3 \cdot 3H_2O$, potassium stannate $K_2SnO_3 \cdot 3H_2O$ and so on.

As the lead salt, there can be used lead acetate $Pb(CH_3COO)_2 \cdot 3H_2O$, lead nitrate $Pb(NO_3)_2$, lead chloride $PbCl_2$ and the like. However, in the case of the lead chloride, it is necessary to treat in advance tin chloride by alkaline hot water.

As the reaction condition for synthesizing fine powder of lead stannate, the pH of aqueous solution is selected from neutral property to alkaline property. If the crystal property is to be controlled, the pH of aqueous solution is selected to be not lower than 8 and not higher than 12. Further, if the diameter of fine powder is to be controlled, the pH of aqueous solution is selected to be not lower than 12. Furthermore, the molar ratio of Pb/Sn is selected in a range from 0.3 to 2.0, preferably from 0.5 to 1.0.

According to the present invention as described above, it is possible to manufacture the fine powder of lead stannate $PbSnO_3$, the particle size of which is very small and uniform and which is high in purity. Unlike the prior art method of mechanically forming the lead stannate into the fine powder by using the ball mill and the like, there is no fear that any impurity is mixed thereto since the present invention uses a wet synthesizing method. In addition, it is possible to change the diameter of the fine powder of the lead stannate to be produced by controlling the synthesizing condition.

When the fine powder of the lead stannate of the present invention is applied to a ceramic capacitor, the fine powder of lead stannate can be sintered at low temperature so that PbO can be contained uniformly in the ceramic capacitor, thus the characteristic of the ceramic capacitor being prevented from being scattered.

The present invention will hereinafter be described with reference to examples.

EXAMPLE 1

50.73 g of $Pb(CH_3COO)_2 \cdot 3H_2O$ was dissolved into water and 35.67 g of $Na_2SnO_3 \cdot 3H_2O$ was added to the aqueous solution for the molar ratio of Pb/Sn to be 1. Then, this aqueous solution was added with 5N-KOH which was adjusted in advance, and pure water so as to make the aqueous solution have the pH 10 and be 500 ml in total volume. This white suspension was stirred while keeping the same at its boiling temperature, reacted for five hours. The yellow precipitate produced after the reaction was repeatedly subjected to decantation several times by hot water to remove impurities such as alkaline ion and the like. After this precipitate was filtered and separated, if this precipitate was dried at temperature of around 90° C., about 50 g of the fine powder was obtained.

The result in which this substance was analyzed by the X-ray diffraction method was same as that shown in FIG. 1 as will be described later and it could be confirmed that this substance was $PbSnO_3$. Further, this $PbSnO_3$ was pyrochroi type of cubic-system. Furthermore, the photograph of this fine powder taken by the scanning electron microscope was analogous to that shown in FIG. 2.

EXAMPLE 2

The measured results of the produced amount of $PbSnO_3$ and the full width half maximum at the (222) peak of the X-ray diffraction pattern for respective reaction conditions by using the same $Pb(CH_3COO)_2 \cdot 3H_2O$ and $Na_2SnO_3 \cdot 3H_2O$ as those in Example 1 were indicated.

Figure 5:
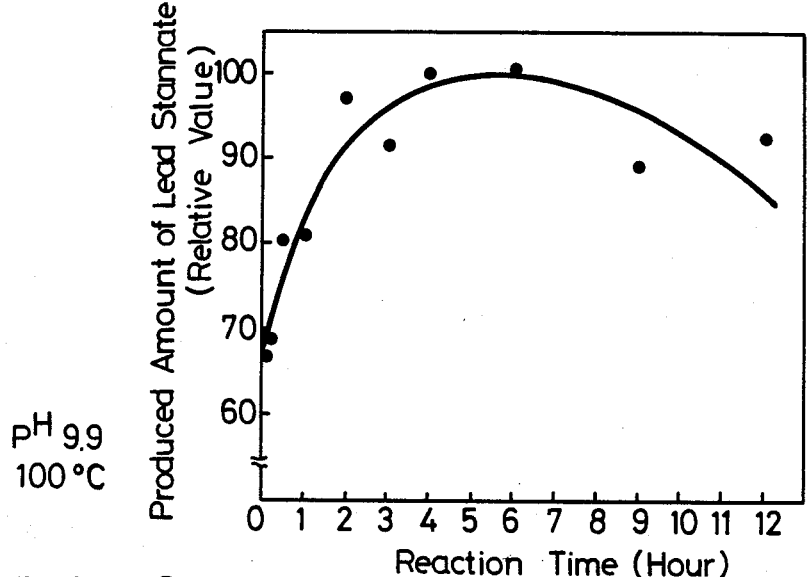
FIGS. 5 and 6 are respectively characteristic graph showing the measured results of the relative product amount and the full width half maximum regarding the dependency of the reaction time.
Figure 6:
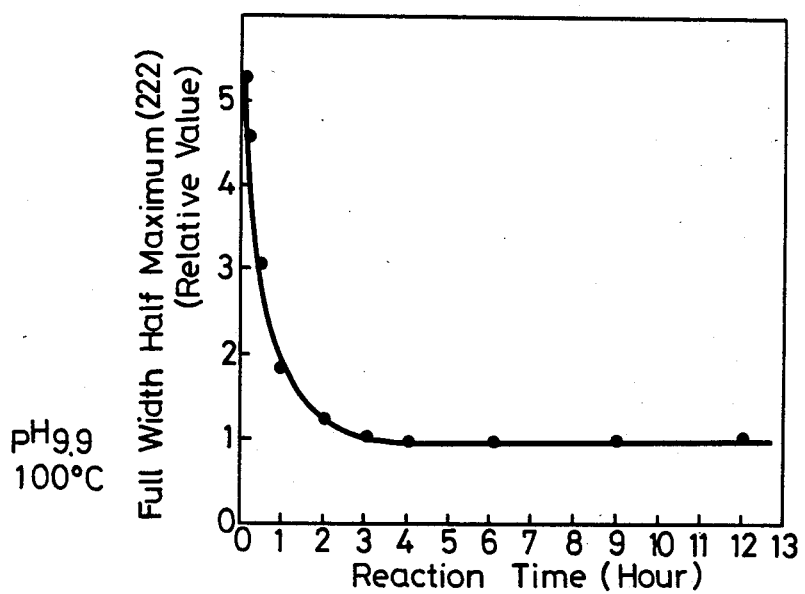

As to the reaction time dependency, the measured results of the relative produced amount and the full width half maximum for the reaction time dependency are respectively shown in FIGS. 5 and 6. As is clear from FIG. 5, the reaction time might be short, for example, might be a duration of period just after the reaction commences, and if the substances are reacted for more than two hours, it is possible to obtain sufficiently high yield. In FIG. 6, the value of the full width half maximum means that if it is smaller, the crystallization property of the powder was excellent and the diameter thereof became large. In this case, the reaction condition was that the pH was 9.9 and the temperature was 100° C.

Figure 7:
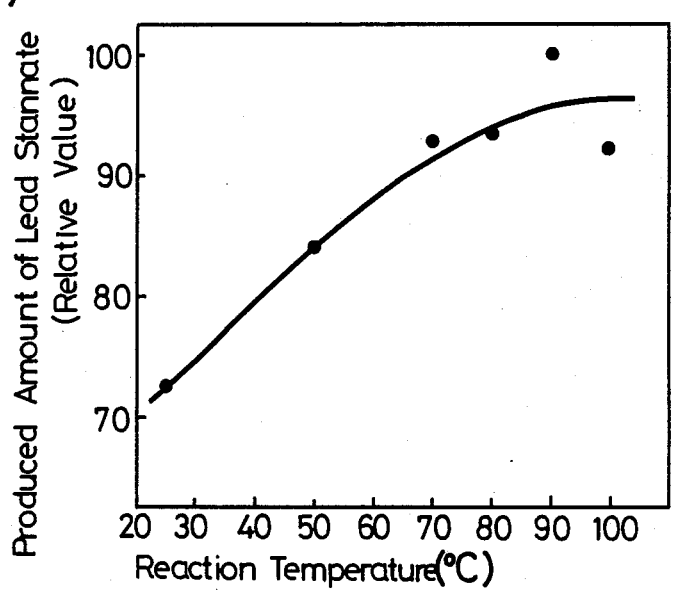
FIGS. 7 and 8 are respectively characteristic graphs showing the measured results of the relative product amount and the full width half maximum regarding the dependency of the reaction temperature.
Figure 8:
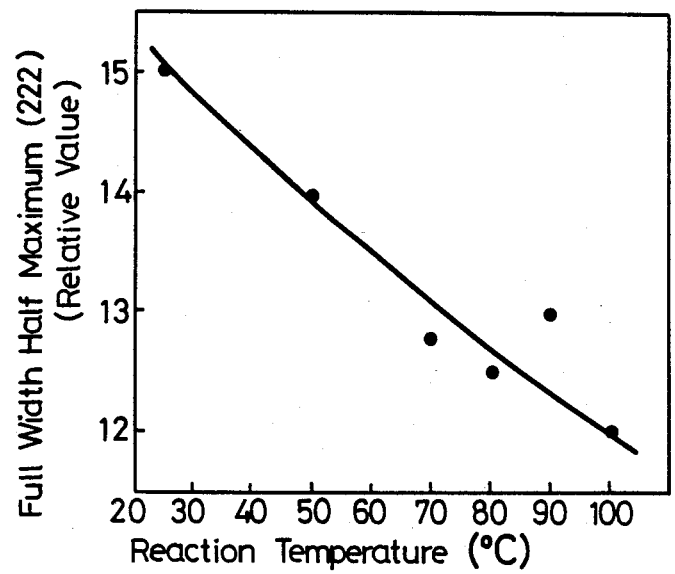

FIGS. 7 and 8 are respectively graphs showing the results of measuring the relative produced amount and the full width half maximum for the reaction temperature dependency. It was sufficient that the reaction temperature was selected to be not lower than 0° C. If the reaction temperature was selected to be not lower than 70° C., the $PbSnO_3$ could be obtained with high yield. The reaction condition was that the pH was 13.5 and the reaction time was five hours.

Figure 9:
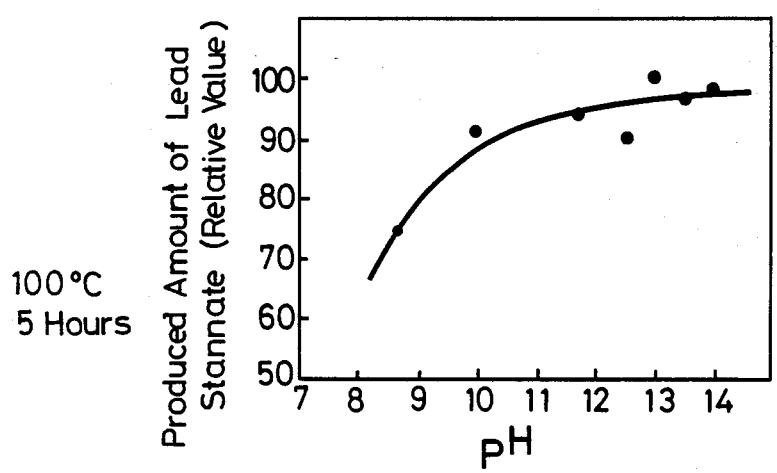
FIGS. 9 and 10 are respectively characteristic graphs showing the measured results of the relative product amount and the full width half maximum regarding the pH dependency.
Figure 10:
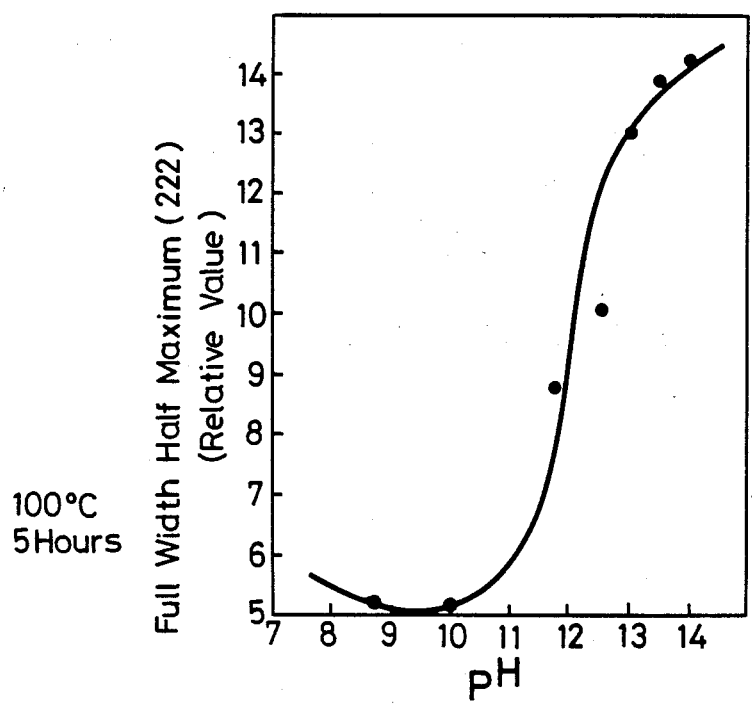

FIGS. 9 and 10 are respectively graphs showing the results of measuring the relative product amount and the full width half maximum for the pH dependency. It was sufficient that the pH was not lower than 7, preferably not lower than 8. Further, if the fine powder of good crystallization property was desired to be obtained, the pH was selected to be not lower than 8 but not higher than 12, while if the fine powder having a small diameter was desired to be obtained, the pH was selected to be not lower than 12. The reaction condition was that the reaction temperature was 100° C. and the reaction time was five hours.

Figure 11:
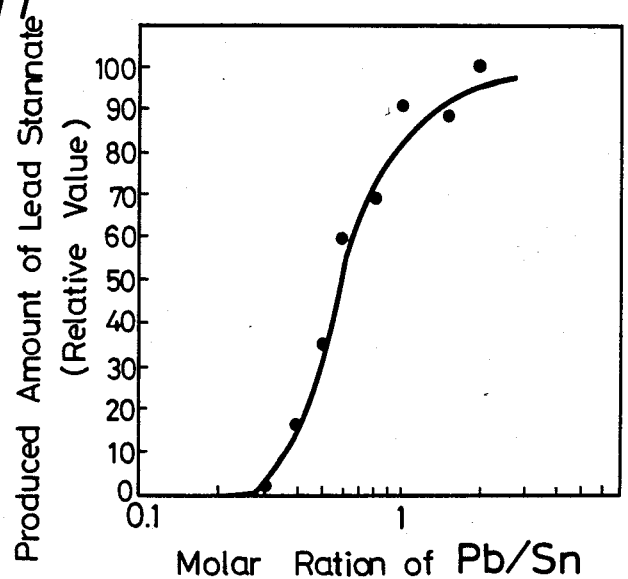
FIGS. 11 and 12 are respectively characteristic graphs showing the measured results of the relative product amount and the full width half maximum regarding the molar ratio dependency of Pb/Sn.
Figure 12:
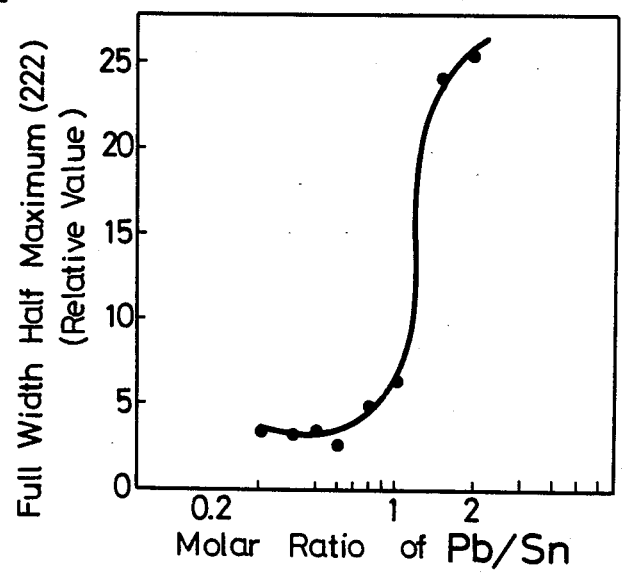

FIGS. 11 and 12 are respectively graphs showing the results of measuring the relative product amount and the full width half maximum for the molar ratio dependency of Pb/Sn. It was sufficient that the molar ratio was selected in a range from 0.3 to 2.0. In this case, if the fine powder having excellent crystallization property was desired to be obtained, the molar ratio was selected to be in a range from 0.5 to 1.0. While, if the fine powder with a small diameter was desired to be obtained, the molar ratio was selected to be in a range from 1.0 to 2.0. The reaction condition was that the pH was 10.7, the reaction temperature was 100° C. and the reaction time was four hours.

Figure 2:
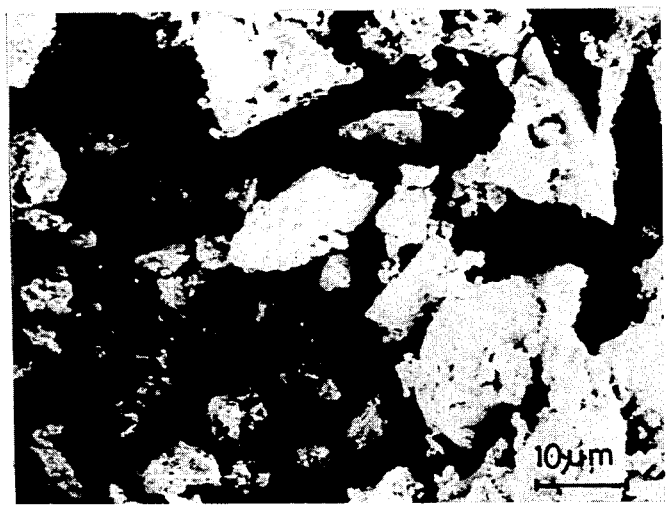
FIG. 2 is a photograph of the fine powder of $PbSnO_3$ shot by a scanning electron microscope.

FIG. 1 shows an X-ray diffraction pattern of the results of measuring the substance that was most excellent in view of the X-ray analysis by using a Cu target and an Ni filter on the basis of such results. According to the ASTM-card, the pattern of such substance was identical with the diffraction pattern of 17607 and hence it was confirmed that this substance was $PbSnO_3$ of pyrochroi type. The lattice constant $a_0$ thereof was 10.705 Å. The reaction conditions for synthesizing the $PbSnO_3$ were that the pH was 10.7, the reaction temperature was 100° C., the reaction time was four hours and the molar ratio of Pb/Sn was 0.6. FIG. 2 shows a photograph of the fine powder synthesized under these reaction conditions taken by the scanning electron microscope.

Figure 3:
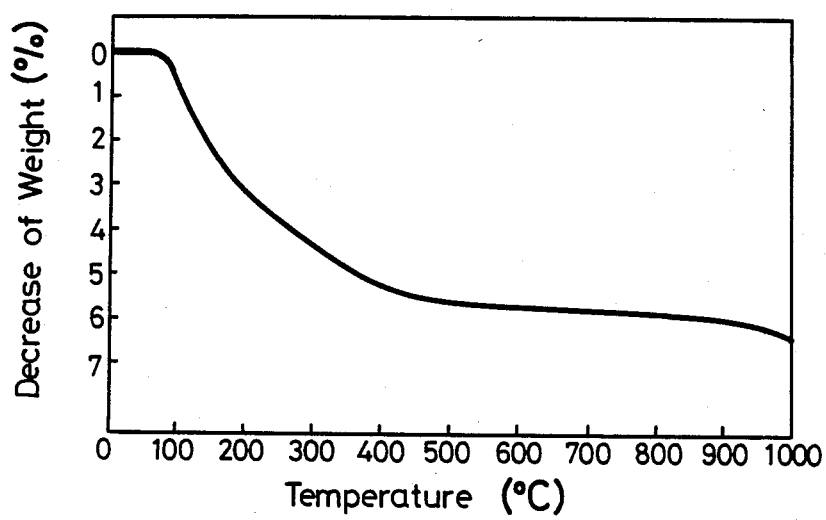
FIG. 3 is a characteristic graph showing the results of thermogravimetric analysis.
Figure 4:
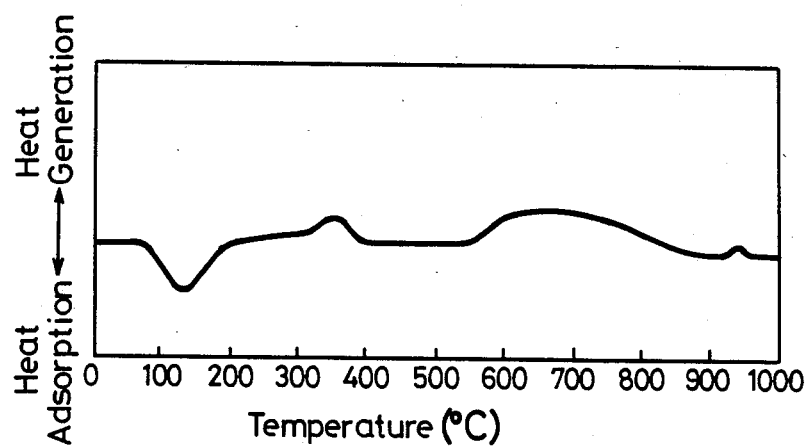
FIG. 4 is a characteristic graph showing the results of a differential thermal analysis.

Furthermore, FIG. 3 shows the results of the thermogravimetric analysis of this fine powder and FIG. 4 shows the results of the differential thermal analysis thereof, respectively.

EXAMPLE 3

50 g of tin chloride $SnCL_4$ was dropped into 100 ml of iced water for two to three minutes to make a tin chloride aqueous solution. Then, 5N-KOH solution and pure water were added to this tin chloride aqueous solution and adjusted so as to make a white suspension whose pH was 7 and the total volume of which was 500 ml. 50 ml of sample was taken out from this suspension, into which 7.281 g of lead acetate $Pb(CH_3COO)_2.3H_2O$ was dissolved. After that, 5N-KOH solution and water were added to this suspension to make an aqueous solution the pH of which was 13 and the volume of which was about 150 ml. Keeping this solution at its boiling temperature, the reaction was carried out for four hours. The yellow precipitate that was produced after the reaction was repeatedly subjected to the decantation, the filtering and the rinsing by water in this sequential order until $PbCl_2$ disappears. Thereafter, this precipitate was dried at 90° C. for 24 hours.

The X-ray diffraction pattern of the substance obtained in the above treatment is substantially the same as that shown in FIG. 1 and it was confirmed that this substance was $PbSnO_3$. In this X-ray diffraction pattern, since the pH of the above example upon reaction was as high as 13 as compared with the pH 10 of the first example, the diameter of the fine powder became small and the full width half maximum thereof was widened as compared with that of the X-ray diffraction pattern of the first example. As mentioned above, if the pH was adjusted, it was possible to obtain $PbSnOhd 3$ having a desired particle diameter. Further, when the PH was selected to be around 9, it was confirmed that the growth of the powder was significant and the peak became more sharp. In other words, the powder diameter became large, while the full width half maximum became small. Furthermore, according to the photograph taken by the electron microscope, the shape of the fine powder in this example was similar to that shown in FIG. 2.

EXAMPLE 4

50 ml of sample was taken out from the 500 ml standard suspension in the Example 2 and 6.357 g of lead nitrate $Pb(NO_3)_2$ was added to this solution. 5N-NaOH and water were added to this solution to adjust the condition of this solution such that the pH thereof became 11 and the volume thereof became about 150 ml. While keeping this suspension at its boiling temperature, the reaction was carried out for five hours. Then, the yellow precipitate which was produced after the reaction was repeatedly subjected to the decantation, the filtering and the rinsing by water in this sequential order until the $PbCl_2$ disappears sufficiently and then dried at temperature of 90° C.

The X-ray diffraction pattern of the substance thus made by the above treatment was substantially the same as that shown in FIG. 1 and it was confirmed that this substance was $PbSnO_3$. Further, according to the photograph taken by the scanning electron microscope, the fine powder of the shape similar to that of the fine powder shown in FIG. 2 was observed.

When the amount of the lead nitrate in this example was decreased to about 4 g less than the above amount, the molar ratio of Pb/Sn was decreased so that the X-ray diffraction pattern having the full width half maximum narrower than that on the X-ray diffraction pattern in FIG. 1 was obtained.

INDUSTRIAL APPLICABILITY

Since the fine powder of $PbSnO_3$ made by the manufacturing method of this invention is small and uniform in particle size, the fine powder of this invention is not only suitable for use with an additive for the ceramic capacitor but also suitable as the raw material for the electrostriction material, the piezo-electric material, the transparent ceramic material and the like. In addition, the fine powder of the present invention can be applied to the additive of the host of the ceramic or the solid solution material.

We claim:

1. A method for manufacturing fine powder of lead stannate which comprises reacting a hydrolyzed product of a tin compound or water soluble stannate with a lead salt in an alkaline aqueous solution having a pH of at least 8 so as to precipitate a fine powder of lead stannate.

2. A method for manufacturing fine powder of lead stannate according to claim 1, characterized in that the pH of said aqueous solution is in the range from 8 to 12.

3. A method for manufacturing fine powder of lead stannate according to claim 1, characterized in that pH of said aqueous solution is not lower than 12.

4. A method for manufacturing fine powder of lead stannate according to claim 1, characterized in that the molar ratio of Pb and Sn is in the range from 0.3 to 2.0.

5. A method for manufacturing fine powder of lead stannate according to claim 1, characterized in that the molar ratio of Pb and Sn is in the range from 0.5 to 1.0.

6. A method for manufacturing fine powder of lead stannate according to claim 1, characterized in that said tin compound is selected from tin chloride, tin nitrate and tin sulfate.

7. A method for manufacturing fine powder of lead stannate according to claim 1, characterized in that said soluble stannate is selected from sodium stannate and potassium stannate.

8. A method for manufacturing fine powder of lead stannate according to claim 1, characterized in that said lead salt is selected from lead acetate, lead nitrate and lead chloride.

* * * * *